US007730073B2

(12) United States Patent
McKee et al.

(10) Patent No.: US 7,730,073 B2
(45) Date of Patent: Jun. 1, 2010

(54) SYSTEM AND A METHOD FOR PRESENTING RELATED ITEMS TO A USER

(75) Inventors: Timothy P. McKee, Seattle, WA (US); David George De Vorchik, Seattle, WA (US); David Joel Sheldon, Seattle, WA (US); Chris J. Guzak, Kirkland, WA (US); Jason Fergus Moore, Redmond, WA (US); Kerem B. Karatal, Bellevue, WA (US); Giampiero Sierra, Seattle, WA (US); Leonard J. Peterson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 10/691,888

(22) Filed: Oct. 23, 2003

(65) Prior Publication Data

US 2005/0091225 A1 Apr. 28, 2005

(51) Int. Cl.
*G06F 17/30* (2006.01)
(52) U.S. Cl. .................... 707/749; 707/805; 707/999.1; 707/999.102
(58) Field of Classification Search ............... 707/1–10, 707/100–104.1, 200–201, 749, 805, 999.102; 715/513, 762, 744, 733, 775–777; 709/203, 709/217–219, 224; 719/315, 326, 328
See application file for complete search history.

(56) References Cited

U.S. PATENT DOCUMENTS

| 5,345,550 | A |   | 9/1994 | Bloomfield |
| 5,485,617 | A | * | 1/1996 | Stutz et al. .................. 719/315 |
| 5,504,852 | A | * | 4/1996 | Thompson-Rohrlich .... 715/835 |
| 5,710,925 | A | * | 1/1998 | Leach et al. ................. 719/316 |
| 5,737,557 | A | * | 4/1998 | Sullivan ...................... 715/765 |
| 5,751,287 | A | * | 5/1998 | Hahn et al. .................. 715/775 |
| 5,832,471 | A | * | 11/1998 | Fukui ............................ 707/1 |
| 5,844,551 | A | * | 12/1998 | Nakajima et al. ........... 715/762 |
| 5,890,176 | A | * | 3/1999 | Kish et al. ................... 715/205 |
| 5,905,492 | A |   | 5/1999 | Straub et al. |
| 5,933,646 | A | * | 8/1999 | Hendrickson et al. ....... 717/169 |
| 5,937,406 | A |   | 8/1999 | Balabine et al. |

(Continued)

FOREIGN PATENT DOCUMENTS

WO 0179982 A2 10/2001

OTHER PUBLICATIONS

Mike Ricciuti, "New Windows Could solve age-old format puzzle—at a price," Mar. 13, 2002, CNET News .com (http://news.com.com/2009-1017-857509.html).

(Continued)

*Primary Examiner*—Miranda Le
(74) *Attorney, Agent, or Firm*—Shook, Hardy & Bacon LLP

(57) ABSTRACT

A system and method for presenting related items to a user. A universal data store is provided which contains a plurality of items. A portion of the items contain relational information that allows relationships between two or more of the plurality of items to be determined. A shell presents a selected item to a user and is configured to utilize the relational information to present one or more items in the data store which are related to the selected item.

11 Claims, 11 Drawing Sheets

U.S. PATENT DOCUMENTS

| | | | | |
|---|---|---|---|---|
| 5,959,624 | A | | 9/1999 | Johnston et al. |
| 5,991,751 | A | * | 11/1999 | Rivette et al. ................. 707/1 |
| 5,995,973 | A | * | 11/1999 | Daudenarde ............ 707/103 R |
| 6,008,806 | A | | 12/1999 | Nakajima et al. ........... 345/335 |
| 6,031,532 | A | | 2/2000 | Gourdol et al. |
| 6,061,695 | A | * | 5/2000 | Slivka et al. ................ 715/513 |
| 6,098,089 | A | * | 8/2000 | O'Connor et al. ........... 718/104 |
| 6,101,513 | A | | 8/2000 | Shakib et al. |
| 6,104,391 | A | * | 8/2000 | Johnston et al. ............. 715/745 |
| 6,115,704 | A | * | 9/2000 | Olson et al. .................... 707/3 |
| 6,121,964 | A | | 9/2000 | Andrew |
| 6,151,608 | A | * | 11/2000 | Abrams ...................... 707/204 |
| 6,160,550 | A | * | 12/2000 | Nakajima et al. ........... 715/745 |
| 6,167,405 | A | * | 12/2000 | Rosensteel et al. .......... 707/102 |
| 6,188,399 | B1 | * | 2/2001 | Voas et al. .................. 715/723 |
| 6,208,992 | B1 | * | 3/2001 | Bruckner .................... 707/100 |
| 6,212,512 | B1 | | 4/2001 | Barney et al. |
| 6,226,630 | B1 | | 5/2001 | Bilmers |
| 6,243,724 | B1 | | 6/2001 | Mander et al. .............. 707/526 |
| 6,339,779 | B1 | * | 1/2002 | Houldsworth ............... 707/206 |
| 6,360,280 | B1 | * | 3/2002 | Jones ......................... 719/328 |
| RE37,722 | E | | 5/2002 | Burnard et al. |
| 6,437,810 | B1 | * | 8/2002 | Nakajima et al. ........... 715/804 |
| 6,499,026 | B1 | * | 12/2002 | Rivette et al. ................. 707/2 |
| 6,501,491 | B1 | | 12/2002 | Brown et al. ................ 345/853 |
| 6,526,399 | B1 | | 2/2003 | Coulson et al. ................ 701/1 |
| 6,526,413 | B2 | | 2/2003 | Schwitters et al. .......... 707/104 |
| 6,613,101 | B2 | | 9/2003 | Mander et al. .............. 715/526 |
| 6,636,250 | B1 | * | 10/2003 | Gasser ....................... 715/853 |
| 6,670,970 | B1 | * | 12/2003 | Bonura et al. ............... 715/768 |
| 6,728,966 | B1 | * | 4/2004 | Arsenault et al. ............. 725/39 |
| 6,768,999 | B2 | * | 7/2004 | Prager et al. ................ 707/102 |
| 6,868,419 | B1 | * | 3/2005 | Melick et al. ............... 707/100 |
| 6,922,708 | B1 | * | 7/2005 | Sedlar ....................... 707/202 |
| 6,978,269 | B1 | * | 12/2005 | Johnson et al. ............. 707/100 |
| 7,039,860 | B1 | | 5/2006 | Gautestad |
| 7,043,488 | B1 | * | 5/2006 | Baer et al. .................. 707/101 |
| 7,047,257 | B2 | * | 5/2006 | Fletcher et al. ............. 707/201 |
| 7,054,851 | B2 | * | 5/2006 | Haley ............................ 707/1 |
| 7,069,308 | B2 | * | 6/2006 | Abrams ...................... 709/218 |
| 7,099,869 | B1 | * | 8/2006 | Forstall et al. ................ 707/10 |
| 7,117,225 | B2 | * | 10/2006 | Cosic ........................ 707/102 |
| 7,293,031 | B1 | * | 11/2007 | Dusker et al. .............. 707/101 |
| 7,366,989 | B2 | * | 4/2008 | Naik et al. .................. 715/736 |
| 2002/0069096 | A1 | * | 6/2002 | Lindoerfer et al. ............. 705/7 |
| 2002/0156792 | A1 | | 10/2002 | Gombocz et al. |
| 2003/0076322 | A1 | | 4/2003 | Ouzts et al. ................. 345/440 |
| 2003/0084096 | A1 | * | 5/2003 | Starbuck et al. ............ 709/203 |
| 2003/0095142 | A1 | | 5/2003 | Patrizio et al. |
| 2003/0120711 | A1 | * | 6/2003 | Katz .......................... 709/106 |
| 2004/0030741 | A1 | * | 2/2004 | Wolton et al. .............. 709/202 |
| 2004/0117799 | A1 | * | 6/2004 | Brockway et al. ........... 719/310 |
| 2004/0122853 | A1 | | 6/2004 | Moore |
| 2004/0128616 | A1 | * | 7/2004 | Kraft .......................... 715/513 |
| 2004/0174396 | A1 | * | 9/2004 | Jobs et al. ................... 345/810 |
| 2004/0177319 | A1 | * | 9/2004 | Horn ......................... 715/501.1 |
| 2004/0205711 | A1 | * | 10/2004 | Ishimitsu et al. ............ 717/116 |
| 2004/0221228 | A1 | * | 11/2004 | Day et al. ................... 715/513 |
| 2004/0230555 | A1 | * | 11/2004 | Phenix et al. .................. 707/1 |
| 2005/0021750 | A1 | * | 1/2005 | Abrams ...................... 709/225 |
| 2005/0049939 | A1 | * | 3/2005 | Lai et al. ...................... 705/27 |
| 2005/0066293 | A1 | * | 3/2005 | Hunt .......................... 715/854 |
| 2005/0193054 | A1 | * | 9/2005 | Wilson et al. ............... 709/200 |
| 2006/0117389 | A1 | * | 6/2006 | Pool ............................. 726/27 |

OTHER PUBLICATIONS

Joe Wilcox, "New Windows leaks onto Net," Mar. 4, 2003, CNET News.com (http://news.com.com/2100-1012-990912.html?tag=fd_ledel_hed).

Oliver Ibslshäuser, "WinFS is Destined to Supersede FAT and NTFS," Jun. 17, 2003, Tom's Hardware Guide, (http://www6.tomshardware.com/storage/20030617/).

Oliver Ibslshäuser, "Clusters, Sectors & Tables," Jun. 17, 2003, Tom's Hardware Guide, (http://www6.tomshardware.com/storage/20030617/winfs-01.html).

Oliver Ibslshäuser, "FAT Problems Under Windows XP," Jun. 17, 2003, Tom's Hardware Guide, (http://www6.tomshardware.com/storage/20030617/winfs-02.html).

Oliver Ibslshäuser, "NTFS: Terabyte-Size Partitions," Jun. 17, 2003, Tom's Hardware Guide, (http://www6.tomshardware.com/storage/20030617/winfs-03.html).

Oliver Ibslshäuser, "Advances in NTFS," Jun. 17, 2003, Tom's Hardware Guide, (http://www6.tomshardware.com/storage/20030617/winfs-04.html).

Oliver Ibslshäuser, "Data Organization Under NTFS," Jun. 17, 2003, Tom's Hardware Guide. (http://www6.tomshardware.com/storage/20030617/winfs-05.html).

Oliver Ibslshäuser, "Conclusion: WinFS—The Future," Jun. 17, 2003, Tom's Hardware Guide, (http://www6.tomshardware.com/storage/20030617/winfs-06.html).

Apple Inc., "Inside Macintosh: Macintosh Toolbox Essentials," Jul. 1996, Apple, Inc., p. 810 (of PDF).

Supplementary European Search Report; Mar. 20, 2007; Appln. No. EP 04 78 6142.

Flink, Lynn, et al., "StuffIt User's Guide" Oct. 2000; Aladdin Systems, Inc., p. 1-3, 77-79, and 84-87.

Westwind Computing, "Mac OS X Hidden Files & Directories" Oct. 2002, Westwind Computing, pp. 1-5.

Landau, Ted, "Mac OS X Disaster Relief: Troubleshooting Techniques to Help Fix It Yourself" Dec. 2002, PeachPit Press.

Noworryz, Explaining the Finder's View Options and Toolbar Visibility, Mar. 2003, MacOSXHints (http://www.macosxhints.com/article.php?story=20030305025744788).

Frogstomp, An AppleScript to quickly show or hide hidden files, Apr. 2003, MacOSXHints (2) (http://www.macosxhints.com/article.php?story=20030409015020645).

Malaysian Search Report; May 22, 2009; Appln. No. PI 20043013.

Bressan, Stephanie, et al; "Context Knowledge Representation and Reasoning in the Context Interchange System"; Massachusetts Institute of Technology, Cambridge, MA; Sep. 9, 1999.

* cited by examiner

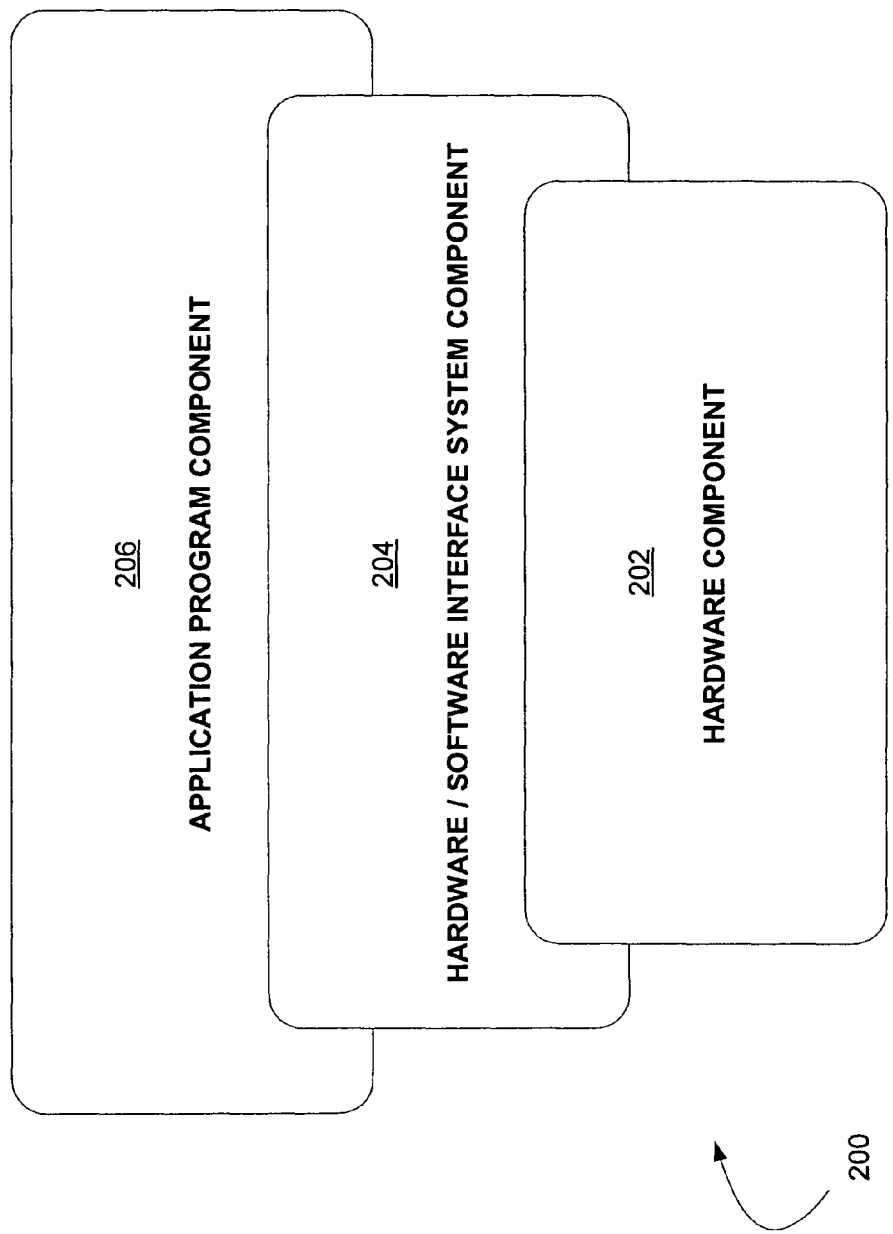

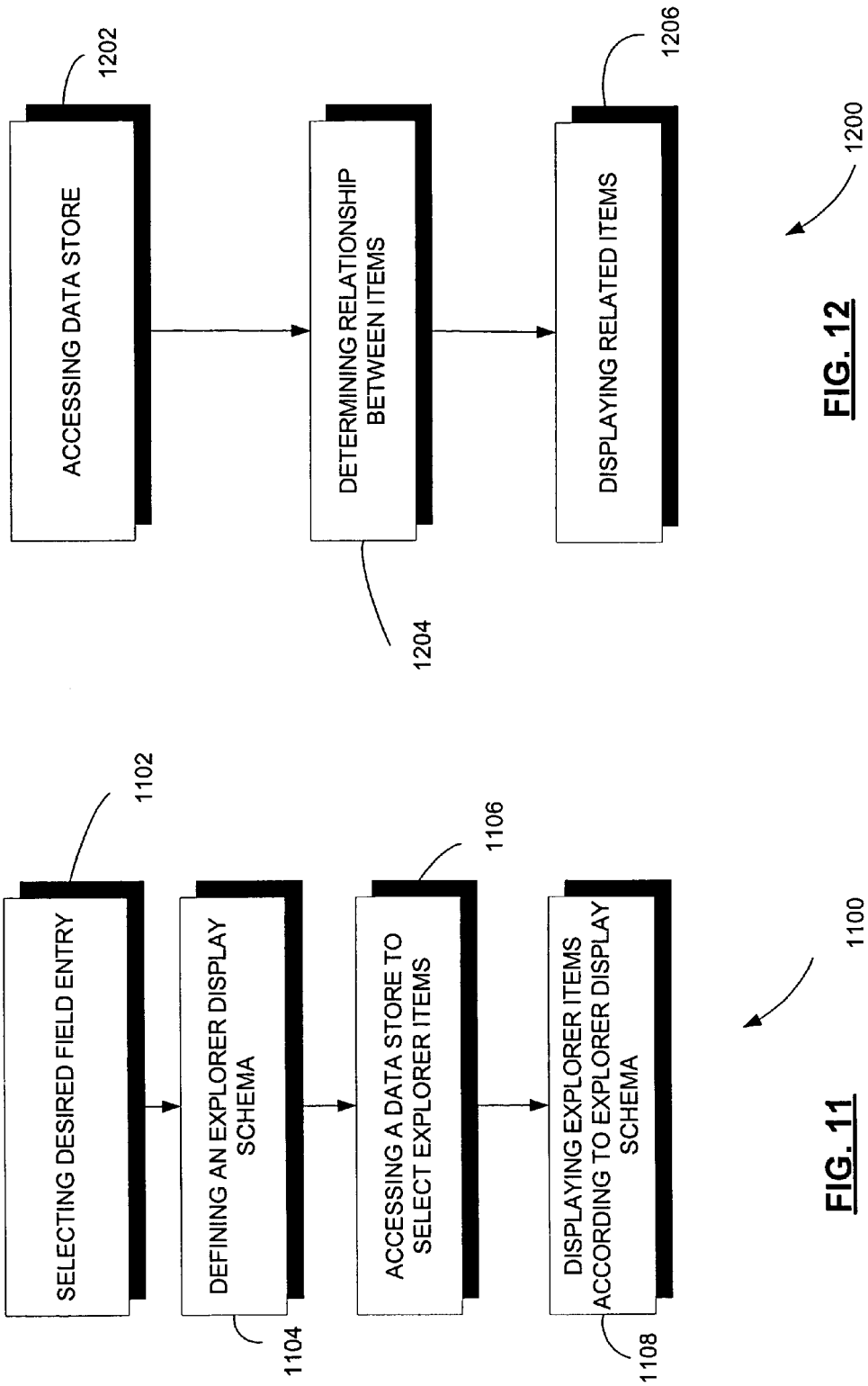

SYSTEM AND A METHOD FOR PRESENTING RELATED ITEMS TO A USER

CROSS-REFERENCE TO RELATED APPLICATIONS

This application is related by subject matter to the inventions disclosed in the following commonly assigned applications: U.S. patent application Ser. No. 10/646,941, filed on Aug. 21, 2003, entitled "SYSTEMS AND METHODS FOR SEPARATING UNITS OF INFORMATION MANAGEABLE BY A HARDWARE/SOFTWARE INTERFACE SYSTEM FROM THEIR PHYSICAL ORGANIZATION"; U.S. patent application Ser. No. 10/646,940, filed on Aug. 21, 2003, entitled "SYSTEMS AND METHODS FOR THE IMPLEMENTATION OF A BASE SCHEMA FOR ORGANIZING UNITS OF INFORMATION MANAGEABLE BY A HARDWARE/SOFTWARE INTERFACE SYSTEM"; U.S. patent application Ser. No. 10/646,632, filed on Aug. 21, 2003, entitled "SYSTEMS AND METHODS FOR THE IMPLEMENTATION OF A CORE SCHEMA FOR PROVIDING A TOP-LEVEL STRUCTURE FOR ORGANIZING UNITS OF INFORMATION MANAGEABLE BY A HARDWARE/SOFTWARE INTERFACE SYSTEM"; U.S. patent application Ser. No. 10/647,058, filed on Aug. 21, 2003, entitled "SYSTEMS AND METHOD FOR REPRESENTING RELATIONSHIPS BETWEEN UNITS OF INFORMATION MANAGEABLE BY A HARDWARE/SOFTWARE INTERFACE SYSTEM"; U.S. patent application Ser. No. 10/646,575, filed on Aug. 21, 2003, entitled "SYSTEMS AND METHODS FOR INTERFACING APPLICATION PROGRAMS WITH AN ITEM-BASED STORAGE PLATFORM"; U.S. patent application Ser. No. 10/646,646, on Aug. 21, 2003, entitled "STORAGE PLATFORM FOR ORGANIZING, SEARCHING, AND SHARING DATA"; U.S. patent application Ser. No. 10/646,580, filed on Aug. 21, 2003, entitled "SYSTEMS AND METHODS FOR DATA MODELING IN AN ITEM-BASED STORAGE PLATFORM"; U.S. patent application Ser. No. 10/691,885, filed on even date herewith, entitled "SYSTEM AND A METHOD FOR PRESENTING ITEMS TO A USER WITH A CONTEXTUAL PRESENTATION" and U.S. patent application Ser. No. 10/691,886, filed on even date herewith, entitled "SYSTEM AND METHOD FOR THE PRESENTATION OF ITEMS STORED ON A COMPUTER."

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to a system and method for displaying items stored on a computer to a user.

BACKGROUND OF THE INVENTION

Providing users of computers with the ability to quickly find and display a piece of information, no matter what the information's format or location, is a challenge that the computer industry has struggled with for many years. Today this problem is more salient then ever as increasing numbers of individuals utilize computers in their daily routines and as the types of information stored on a computer continues to diversify.

Traditionally, as in Microsoft Corporation's WINDOWS® 98™, this stored information is kept within a data store on the computer in a hierarchical fashion organized with files of information or media stored within folders. While this method of data storage has been widely used for many years, it is limited in that some data resides outside of the file hierarchy and users are constrained to format and locational limitations when searching for desired pieces of information. Accordingly, providers of computer software are currently working on data storage alternatives to the traditional file hierarchy.

An example of such a data storage alternative is disclosed in the commonly owned, co-pending application "SYSTEM AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION", U.S. patent application Ser No. 10/647,058. This co-pending application was filed on Aug. 21, 2003 and discloses a data store that unifies storage into a single database. This database is the one place where all the data is stored; there is only one way to represent data to the database and only one way to query for data. By replacing antiquated file systems with this modern database technology, the data store will be easily searchable, more reliable, more accessible, and more resilient.

Once this unified data store is in place, there becomes a need to provide users with the appropriate tools and capabilities to interact with the stored data. Conventional operating systems, such as Microsoft Corporation's WINDOWS® 2000™, include a shell utility that provides a user interface for viewing various information about the computer. The shell typically includes a file system browser which enables users to navigate through the file system and locate and open files and folders. For example, Microsoft Corporation's WINDOWS® EXPLORER™ is a file system browser utility included with WINDOWS® 2000™.

The shell also enables users to view non-file items such as printers or fonts. This navigation is possible because a typical shell is programmed with the specific functionality to display these special items as if they were located in the file system. For example, in WINDOWS® 2000™, a user may open a "Printers" folder located within the Settings option on the Start Menu. Because printers are pieces of hardware and not files, this graphical representation of the printers is accomplished through utilization of custom code directed at displaying the printers as if they were files residing in the "Printers" folder. However, the use of custom code and custom drawing exceptions is complex for developers to implement, can be unreliable, and reduces the resiliency of the shell browser. Furthermore, if no custom code or custom drawing exceptions are in place for a type of data, the shell will be unable to display items of that type. Accordingly, conventional shells are limited in capabilities and in flexibility when displaying certain items to a user.

Another limitation of conventional shell browsers is a restricted ability to display items in a relational manner. Typically a shell browser is operable to display items only in the hierarchical fashion in which they are stored—organized within files stored within folders. For example, if a user desires to view all the picture files stored on a computer, that user must first place all such picture files in the same folder. Because the shell has limited capacity to determine relationships between items, it is difficult for a user to view files in a relationship driven context.

Furthermore, conventional shell browsers are limited in their ability to display sets of items within a contextually tailored environment that pairs pertinent information and tasks with the set of displayed items. Developers, by providing such pairings, can provide users with the appropriate information and tools needed to navigate among the items while facilitating the performance of commons tasks associated with the items. The prior art, however, does not allow developers to provide such experiences without the use of custom code.

An example of files presented in an enhanced environment through the utilization of custom code is the My Pictures folder which is included in Microsoft Corporation's WINDOWS® XP™ operating system. When image files are stored in the My Pictures folder, a user can view images at different sizes, rotate them, view a slide show, print images, or copy images to a CD. The shell in WINDOWS® XP™ has utilized custom code to incorporate these image-related tasks into this folder's display so that a user, when choosing to store pictures in this particular folder, will easily be able to navigate among the pictures and to perform common tasks with respect to the files. However, only files stored in the My Pictures folder are displayed in this environment, and custom code is utilized to create this functionality. While the My Pictures folder is an improvement over traditional presentation of items, developers still have limited ability to define such content-rich environments without utilizing custom code.

Accordingly, there is a need for an improved shell that is capable of displaying each item within a universal data store, and further, there is a need for an improved shell that is configured to present items within a universal data store in a relationship driven context. There is also a need for improved capabilities within the shell for developers to create custom environments that display items with appropriate contextual information and related tasks without needing custom code.

SUMMARY OF THE INVENTION

The present invention meets the above needs and overcomes one or more deficiencies in the prior art by providing a system configured to present related items stored in a data store to a user. In one aspect of the present invention, a system for presenting related items to a user is provided. A universal data store is included which contains a plurality of items. At least of portion of the items in the data store contain relational information. A shell utilizes the relational information to present related items.

A further aspect of the invention is a computer-implemented method for presenting related items to a user. The method accesses data in a universal data store that contains items including information which allows relationships between items in the data store to be determined. This relational information is utilized to determine a relationship between items, and related items are displayed to a user.

BRIEF DESCRIPTION OF THE SEVERAL VIEWS OF THE DRAWINGS

The present invention is described in detail below with reference to the attached drawing figures, wherein:

FIG. 2A is a block diagram illustrating a computer system divided into three component groups: the hardware component, the hardware/software interface system component, and the application programs component;

FIG. 11 is a flow diagram showing a method for presenting related items to a user in accordance with one embodiment of the present invention.

FIG. 12 is also a flow diagram showing a method for presenting related items to a user in accordance with one embodiment of the present invention.

DETAILED DESCRIPTION OF THE INVENTION

I. Introduction

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

The present invention provides an improved system and method for displaying items stored on a computer to a user. An exemplary operating environment for the present invention is described below.

A. Exemplary Operating Environment

Figure 1:
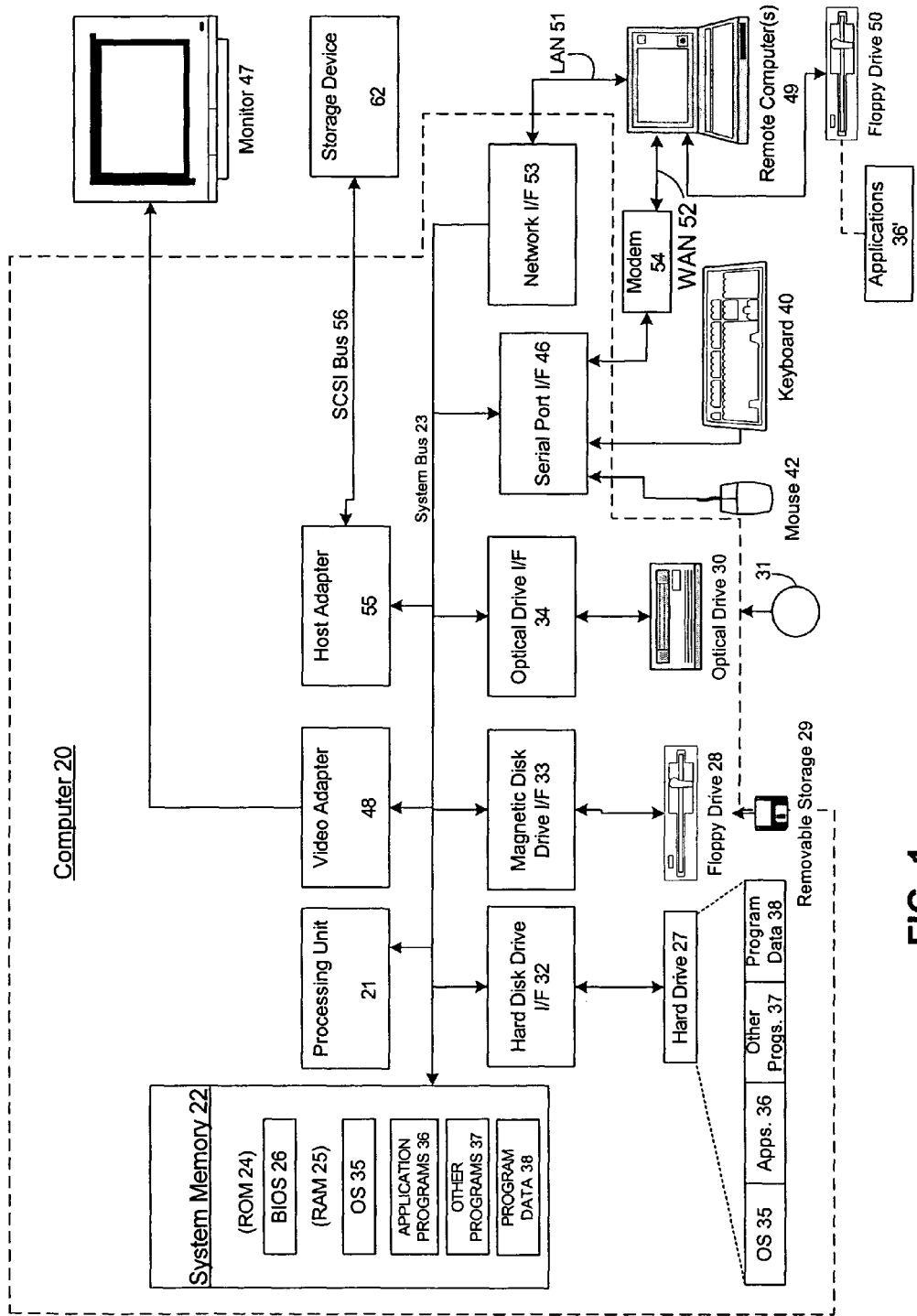
FIG. 1 is a block diagram of a computing system environment suitable for use in implementing the present invention.

Numerous embodiments of the present invention may execute on a computer. FIG. 1 and the following discussion is intended to provide a brief general description of a suitable computing environment in which the invention may be implemented. Although not required, various aspects of the invention may be described in the general context of computer executable instructions, such as program modules, being executed by a computer, such as a client workstation or a server. Generally, program modules include routines, programs, objects, components, data structures and the like that perform particular tasks or implement particular abstract data types. Moreover, the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Likewise, the exemplary environment may also include many types of monitoring devices such as heat sensors and security or fire alarm systems, and other sources of information.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As illustrated in the block diagram of FIG. 2A, a computer system 200 can be roughly divided into three component groups: the hardware component 202, the hardware/software interface system component 204, and the applications programs component 206 (also referred to as the "user component" or "software component" in certain contexts herein).

In various embodiments of a computer system 200, and referring back to FIG. 1, the hardware component 202 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 202 comprises the basic physical infrastructure for the computer system 200.

The applications programs component 206 comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users).

The hardware/software interface system component 204 comprises (and, in some embodiments, may solely consist of) an operating system that itself comprises, in most cases, a shell and a kernel. An "operating system" (OS) is a special program that acts as an intermediary between application programs and computer hardware. The hardware/software interface system component 204 may also comprise a virtual machine manager (VMM), a Common Language Runtime (CLR) or its functional equivalent, a Java Virtual Machine (JVM) or its functional equivalent, or other such software components in the place of or in addition to the operating system in a computer system. The purpose of a hardware/software interface system is to provide an environment in which a user can execute application programs. The goal of any hardware/software interface system is to make the computer system convenient to use, as well as utilize the computer hardware in an efficient manner.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (simply referred to herein as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. A "shell browser" provides a user interface allowing a user to view and to interact with the hardware/software interface. In contrast to a shell, a kernel is a hardware/software interface system's innermost layer that interacts directly with the hardware components.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

B. Traditional File Based Storage

In most computer systems today, "files" are units of storable information that may include the hardware/software interface system as well as application programs, data sets, and so forth. In all modern hardware/software interface systems (Windows, Unix, Linux, Mac OS, virtual machine systems, and so forth), files are the basic discrete (storable and retrievable) units of information (e.g., data, programs, and so forth) that can be manipulated by the hardware/software interface system. Groups of files are generally organized in "folders." In Microsoft Windows, the Macintosh OS, and other hardware/software interface systems, a folder is a collection of files that can be retrieved, moved, and otherwise manipulated as single units of information. These folders, in turn, are organized in a tree-based hierarchical arrangement called a "directory" (discussed in more detail herein below). In certain other hardware/software interface systems, such as DOS, z/OS and most Unix-based operating systems, the terms "directory" and/or "folder" are interchangeable, and early Apple computer systems (e.g., the Apple IIe) used the term "catalog" instead of directory; however, as used herein, all of these terms are deemed to be synonymous and interchangeable and are intended to further include all other equivalent terms for and references to hierarchical information storage structures and their folder and file components.

Figure 2B:
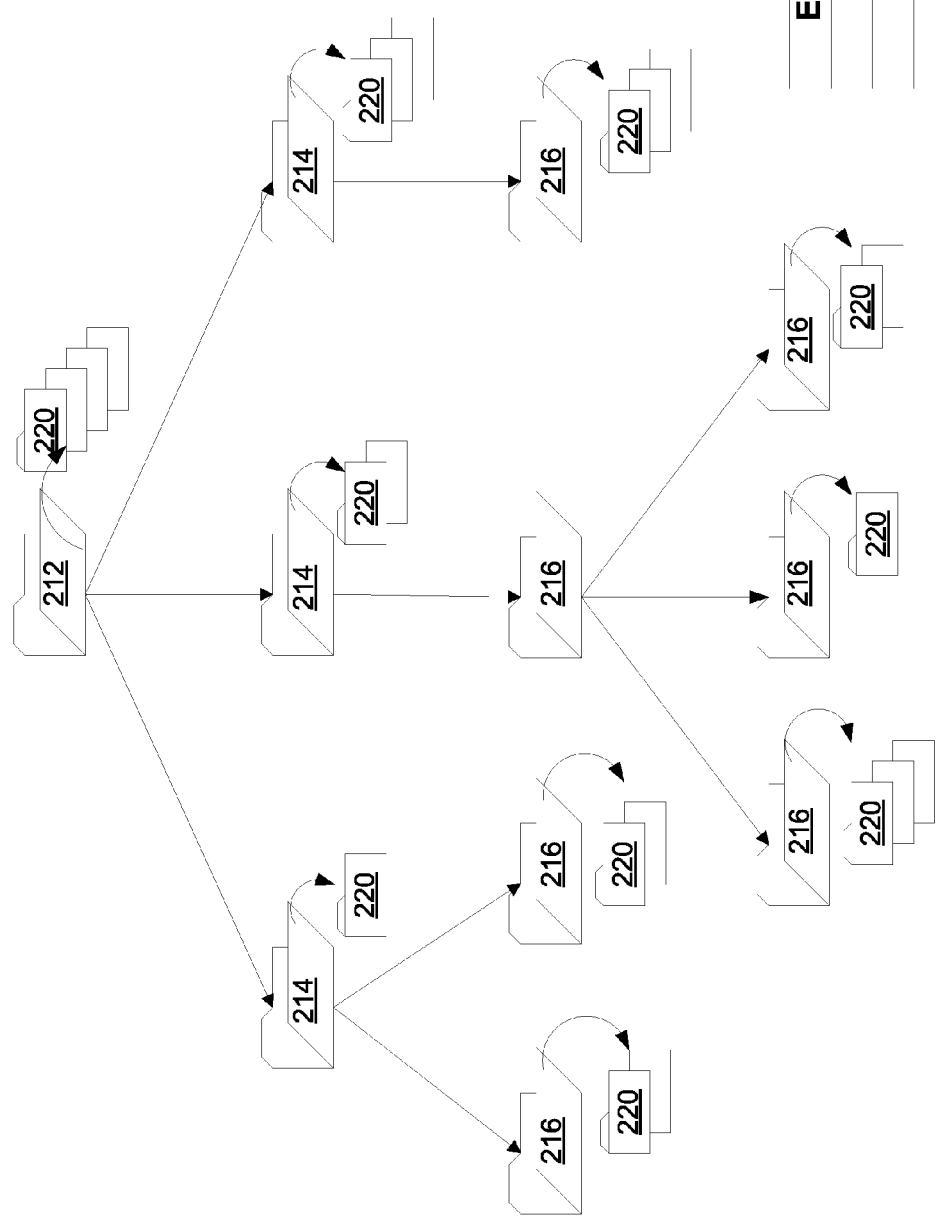
FIG. 2B illustrates the traditional tree-based hierarchical structure for files grouped in folders in a directory in a file-based operating system.

Traditionally, a directory (a.k.a. a directory of folders) is a tree-based hierarchical structure wherein files are grouped into folders and folder, in turn, are arranged according to relative nodal locations that comprise the directory tree. For example, as illustrated in FIG. 2B, a DOS-based file system base folder (or "root directory") 212 may comprise a plurality of folders 214, each of which may further comprise additional folders (as "subfolders" of that particular folder) 216, and each of these may also comprise additional folders 218 ad infinitum. Each of these folders may have one or more files 220 although, at the hardware/software interface system level, the individual files in a folder have nothing in common other than their location in the tree hierarchy. Not surprisingly, this approach of organizing files into folder hierarchies indirectly reflects the physical organization of typical storage media used to store these files (e.g., hard disks, floppy disks, CD-ROMs, etc.).

In addition to the foregoing, each folder is a container for its subfolders and its files—that is, each folder owns its subfolders and files. For example, when a folder is deleted by the hardware/software interface system, that folder's subfolders and files are also deleted (which, in the case of each subfolder, further includes its own subfolders and files recursively). Likewise, each file is generally owned by only one folder and, although a file can be copied and the copy located in a different folder, a copy of a file is itself a distinct and separate unit that has no direct connection to the original (e.g., changes to the original file are not mirrored in the copy file at the hardware/software interface system level). In this regard, files and folders are therefore characteristically "physical" in nature because folders are the treated like physical containers, and files are treated as discrete and separate physical elements inside these containers.

II. A Universal Data Store

The storage platform utilized by the present invention extends and broadens the data platform beyond the kinds of existing file systems discussed above, and is designed to be a store for all types of data. A data store designed to store all types of data may be referred to as a universal data store. An example of a universal data store suitable for use with the present invention is described in the commonly owned, co-pending application "SYSTEM AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION", U.S. patent application Ser. No. 10/647,058 filed on Aug. 21, 2003, which is hereby incorporated by reference.

A. Storage Platform Overview

Figure 3:
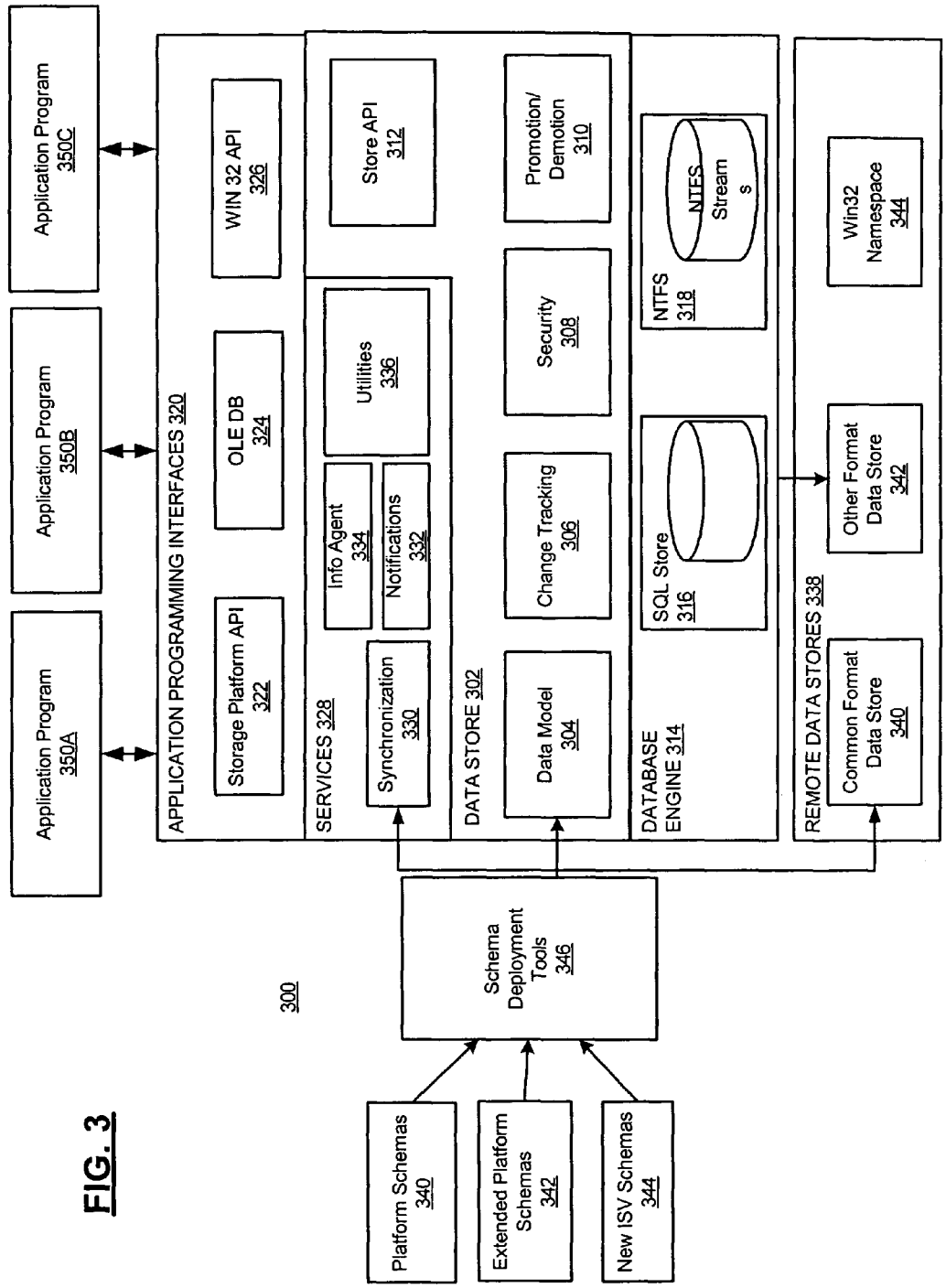
FIG. 3 is a block diagram illustrating a storage platform in accordance with the present invention.

Referring to FIG. 3, a storage platform 300 in accordance with the present invention comprises a universal data store 302 implemented on a database engine 314. In one embodiment, the database engine 314 comprises a relational database engine with object relational extensions. In one embodiment, the relational database engine 314 comprises the Microsoft SQL Server relational database engine.

The universal data store 302 implements a data model 304 that supports the organization, searching, sharing, synchronization, and security of data. Specific types of data are described in schemas, such as schemas 340, and the storage platform 300 provides tools 346 for deploying those schemas as well as for extending those schemas, as described more fully below.

A change tracking mechanism 306 implemented within the universal data store 302 provides the ability track changes to the data store. The universal data store 302 also provides security capabilities 308 and a promotion/demotion capability 310. The universal data store 302 also provides a set of application programming interfaces 312 to expose the capabilities of the universal data store 302 to other storage platform components and application programs (e.g., application programs 350A, 350B, and 350C) that utilize the storage platform.

The storage platform of the present invention still further comprises an application programming interfaces (API) 322, which enables application programs, such as application programs 350A, 350B, and 350C, to access all of the foregoing capabilities of the storage platform and to access the data described in the schemas. The storage platform API 322 may be used by application programs in combination with other APIs, such as the OLE DB API 324 and the Microsoft Windows Win32 API 326.

The storage platform 300 of the present invention may provide a variety of services 328 to application programs, including a synchronization service 330 that facilitates the sharing of data among users or systems. For example, the synchronization service 330 may enable interoperability with other data stores 340 having the same format as data store 302, as well as access to data stores 342 having other formats. The storage platform 300 also provides file system capabilities that allow interoperability of the universal data store 302 with existing file systems, such as the Windows NTFS files system 318.

In at least some embodiments, the storage platform 320 may also provide application programs with additional capabilities for enabling data to be acted upon and for enabling interaction with other systems. These capabilities may be embodied in the form of additional services 328, such as an Info Agent service 334 and a notification service 332, as well as in the form of other utilities 336.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent.

Through its common storage foundation, and schematized data, the storage platform of the present invention enables more efficient application development for consumers, knowledge workers and enterprises. It offers a rich and extensible programming surface area that not only makes available the capabilities inherent in its data model, but also embraces and extends existing file system and database access methods.

B. The Data Model

The universal data store 302 of the storage platform 300 of the present invention implements a data model that supports the organization, searching, sharing, synchronization, and security of data that resides in the store. In the data model of the present invention, the fundamental unit of storage information may be referred to as an item. The data model provides a mechanism for declaring items and item extensions and for establishing relationships between items and for organizing items in folders and in categories.

In one embodiment of the present invention, the data model relies on two primitive mechanisms, Types and Relationships. Types are structures that provide a format which governs the form of an instance of the Type. The format is expressed as an ordered set of Properties. A Property is a name for a value or set of values of a given Type. For example, a USPostalAddress type might have the properties Street, City, Zip, State. Properties may be required or optional.

Relationships can be declared and represent a mapping between the sets of instances of two types. For example, there may be a Relationship declared between the Person Type and the Location Type called LivesAt which defines which people live at which locations. The Relationship has a name, two endpoints, namely a source endpoint and a target endpoint. Relationships may also have an ordered set of properties. Both the Source and Target endpoints have a Name and a Type. For example the LivesAt Relationship has a Source called Occupant of Type Person and a Target called Dwelling of Type Location and in addition has properties StartDate and EndDate indicating the period of time for which the occupant lived at the dwelling. Note that a Person may live at multiple dwellings over time and a dwelling may have multiple occupants so the most likely place to put the StartDate and EndDate information is on the relationship itself.

Relationships define a mapping between instances that is constrained by the types given as the endpoint types. For example the LivesAt relationship cannot be a relationship in which an Automobile is the Occupant because an Automobile is not a Person.

1. Items

As mentioned above, the fundamental unit of storage information in a universal data store according to the present invention may be referred to as an item. An item is a unit of storable information that, unlike a simple file, is an object having a basic set of properties that are commonly supported across all objects exposed to an end-user or application program by the storage platform. Those skilled in the art will recognize that the universality of the universal data store is made possible, in part, because each item in the data store includes data indicating these basic properties stored in accordance a data schema that is constant for each item.

The universal data schema provides a universal foundation that establishes a conceptual framework for creating and organizing items and properties. The universal data schema defines certain special types of items and properties, and the features of these special foundational types from which subtypes can be further derived. The use of this universal data schema allows a programmer to conceptually distinguish items (and their respective types) from properties (and their respective types). Moreover, the universal data schema sets forth the foundational set of properties that all items may possess as all items (and their corresponding item Types) are derived from this foundational item in the universal data schema (and its corresponding item Type). By storing each item according to this universal data schema, a shell browser is able to interpret and present each item in the data store along with its basic properties to the user. An example of a universal data schema suitable for use with the present invention is described in the commonly owned, co-pending application "SYSTEM AND METHODS FOR REPRESENTING UNITS OF INFORMATION MANAGEABLE BY A HARDWARE/SOFTWARE INTERFACE SYSTEM BUT INDEPENDENT OF PHYSICAL REPRESENTATION", U.S. patent application No. (not yet assigned) (Atty. Docket No. MSFT-1748) filed on Aug. 21, 2003, which is hereby incorporated by reference.

Items also have properties and relationships that are commonly supported across all item types including features that allow new properties and relationships to be introduced. Those skilled in the art will recognize that this property and relationship data may be referred to as metadata associated with an item. As described below, the metadata may be stored in accordance with an item decoration schema. This item decoration schema may indicate an appropriate manner which to present the item to a user.

Items are the objects for common operations such as copy, delete, move, open, print, backup, restore, replicate, and so forth. Items are the units that can be stored and retrieved, and all forms of storable information manipulated by the storage platform exist as items, properties of items, or relationships between items, each of which is discussed in greater detail herein below.

Items are intended to represent real-world and readily-understandable units of data like Contacts, People, Services, Locations, Documents (of all various sorts), and so on.

Items are stand-alone objects; thus, if you delete an item, all of the item's properties are also deleted. Similarly, when retrieving an item, what is received is the item and all of its properties contained in the item's metadata. Certain embodiments of the present invention may enable one to request a subset of properties when retrieving a specific item; however, the default for many such embodiments is to provide the item with all of its immediate and inherited properties when retrieved. Moreover, the properties of items can also be extended by adding new properties to the existing properties of that item's type. These "extensions" are thereafter bona fide properties of the item and subtypes of that item type may automatically include the extension properties. The extensions may also be referred to as metadata associated with a file.

2. Item Folders and Categories

Groups of items can are organized into special items called item Folders (which are not to be confused with file folders). Unlike in most file systems, however, an item can belong to more than one item Folder, such that when an item is accessed in one item Folder and revised, this revised item can then be accessed directly from another item folder. In essence, although access to an item may occur from different item Folders, what is actually being accessed is in fact the very same item. However, an item Folder does not necessarily own all of its member items, or may simply co-own items in conjunction with other folders, such that the deletion of an item Folder does not necessarily result in the deletion of the item.

Items may also belong to Categories based on common described characteristic such as (a) an item Type (or Types), (b) a specific immediate or inherited property (or properties), or (c) a specific value (or values) corresponding to an item property. For example, an item comprising specific properties for personal contact information might automatically belong to a Contact Category, and any item having contact information properties would likewise automatically belong to this Category. Likewise, any item having a location property with a value of "New York City" might automatically belong to a NewYorkCity Category.

Categories are conceptually different form item Folders in that, whereas item Folders may comprise items that are not interrelated (i.e., without a common described characteristic), each item in a Category has a common type, property, or value (a "commonality") that is described for that Category, and it is this commonality that forms the basis for its relationship to and among the other items in the Category. Moreover, whereas an item's membership in a particular Folder is not compulsory based on any particular aspect of that item, for certain embodiments all items having a commonality categorically related to a Category might automatically become a member of the Category at the hardware/software interface system level. Conceptually, Categories can also be thought of as virtual item Folders whose membership is based on the results of a specific query (such as in the context of a database), and items that meet the conditions of this query (defined by the commonalities of the Category) would thus comprise the Category's membership.

Figure 4:
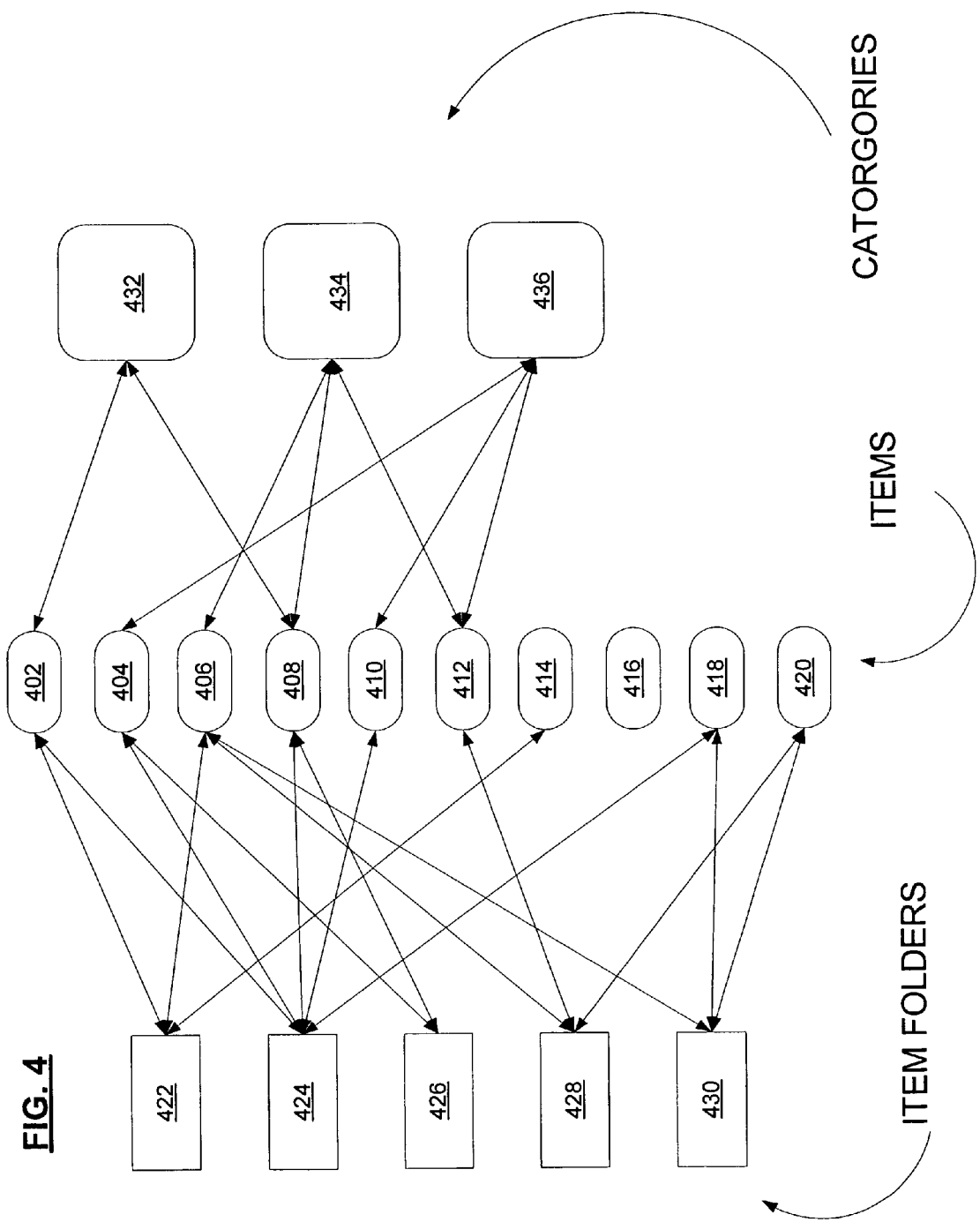
FIG. 4 illustrates the structural relationship between Items, Item Folders, and Categories in various embodiments of the present invention.

FIG. 4 illustrates the structural relationship between items, item Folders, and Categories in various embodiments of the present invention. A plurality of items 402, 404, 406, 408, 410, 412, 414, 416, 418, and 420 are members of various item Folders 422, 424, 426, 428, and 430. Some items may belong to more than one item Folder, e.g., item 402 belong to item Folders 422 and 424. Some items, e.g., item 402, 404, 406, 408, 410, and 412 are also members of one or more Categories 432, 434, and 436, while other times, e.g., items 414, 416, 418, and 420, may belong to no Categories (although this is largely unlikely in certain embodiments where the possession of any property automatically implies membership in a Category, and thus an item would have to be completely featureless in order not to be a member of any category in such an embodiment). In contrast to the hierarchical structure of folders, both Categories and item Folders have structures more akin to directed graphs as shown. In any event, the items, item Folders, and Categories are all items (albeit of different item Types).

In contrast to files, folders, and directories, the items, item Folders, and Categories of the present invention are not characteristically "physical" in nature because they do not have conceptual equivalents of physical containers, and therefore items may exist in more than one such location. The ability for items to exist in more than one item Folder location as well as being organized into Categories provides an enhanced and enriched degree of data manipulation and storage structure capabilities at the hardware/software interface level, beyond that currently available in the art.

3. Relationships

Items may also contain relational information which allows relationships between two or more items to be determined. Relationships are binary relationships where one item is designated as source and the other item as target. The source item and the target item are related by the relationship. Relationships may be classified into: Containment and Reference relationships. The containment relationships control the life-time of the target items, while the reference relationships do not provide any life-time management semantics.

The Containment relationship types are further classified into Holding and Embedding relationships. A holding relationship controls the life-time of the target through a reference counting mechanism. Holding relationships do not contain their targets but control the life-time of the targets. When all holding relationships to an item are removed, the item is deleted. The embedding relationships enable modeling of compound items and can be thought of as exclusive holding relationships. An item can be a target of one or more holding relationships, but an item can be target of exactly one embedding relationship. An item that is a target of an embedding relationship cannot be a target of any other holding or embedding relationships. Embedded relationships contain their targets and control life-time of the targets. Those skilled in the art will recognize that a single target can be in at most one embedded relationship, while a single target can be in multiple holding relationships.

Reference relationships do not control the lifetime of the target item. They may be dangling—the target item may not exist. Reference relationships can be used to model references to items anywhere in the global item name space (i.e. including remote data stores).

Fetching an item does not automatically fetch its relationships. Applications or the shell must explicitly request the relationships of an item. In addition, modifying a relationship does not modify the source or the target item; similarly, adding a relationship does not affect the source/target item. Relationships between two items may be declared and stored with an item or the shell or an application, through utilization of the relational information, may determine the two items are related.

The Reference relationship does not control life time of the item it references. Even more, the reference relationships do not guarantee the existence of the target, nor do they guarantee the type of the target as specified in the relationship declaration. This means that the Reference relationships can be dangling. Also, the reference relationship can reference items in other data stores. Reference relationships can be thought of as a concept similar to links in web pages.

In at least one embodiment, the storage platform of the present invention supports ordering of relationships. The ordering is achieved through a property named "Order." There is no uniqueness constraint on the Order field. The order of the relationships with the same "order" property value is not guaranteed, however it is guaranteed that they may be ordered after relationships with lower "order" value and before relationships with higher "order" field value. It should be noted that property "Order" is not in the base relationship definition. Rather, this is an extrinsic property which is stored as part of the relationship between source and target.

As previously mentioned, an item may be a member of an item Folder. In terms of Relationships, an item may have a relationship with an item Folder. In several embodiments of the present invention, certain relationships are represented by Relationships existing between the items.

4. Extensibility

Referring to FIG. 3, the storage platform is provided with an initial set of schemas 340, as described above. In addition, however, in at least some embodiments, the storage platform allows customers, including independent software vendor (ISVs), to create new schemas 344.

C. Database Engine

As mentioned above, the data store is implemented on a database engine. In one embodiment, the database engine comprises a relational database engine that implements the SQL query language, such as the Microsoft SQL Server engine, with object relational extensions. It is understood, however, that different database engines may be employed. Indeed, in addition to implementing the storage platform conceptual data model on a relational database engine, it can also be implemented on other types of databases, e.g. object-oriented and XML databases.

III. Presentment of Items to a User

Items in the universal data store are presented to a user by a shell browser. Such browsers are well-known in the art and, as explained above, a shell browser provides a user interface allowing a user to view and to interact with the hardware/software interface.

A. Default Display View

As noted above, each item in the universal data store is stored in accordance with a universal data schema. This schema includes a mechanism for describing items called type associations. Each type association has a basic representation in the shell; by storing an item in accordance with a type association, the shell is able to display an item according to at least a basic or default display view.

A type association is a property associated with an item; when placing data into the universal data store one or more properties associated with the data must be declared so as to determine what type of item it is. These properties may be included as metadata associated with the data. The shell has a set of default type associations which represent the most basic and minimal properties which must be declared for an item.

Figure 5:
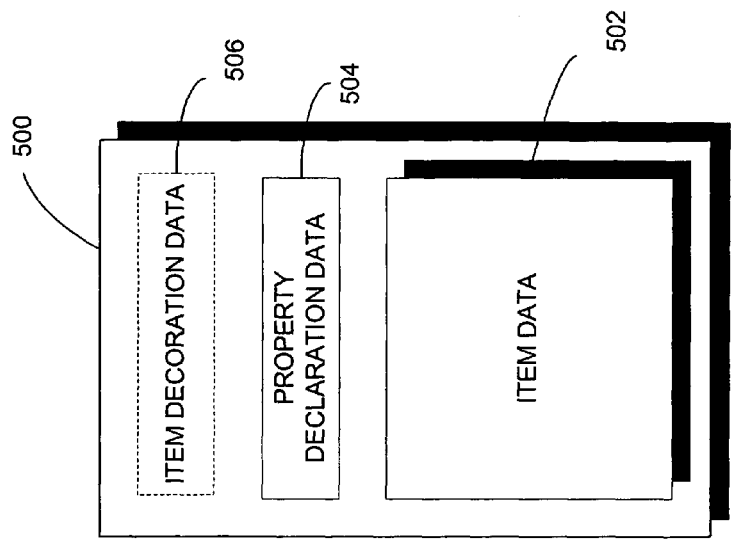
FIG. 5 is a diagram of the data contained within an item according to one embodiment of the present invention.

FIG. 5 displays an item 500. The item 500 is stored in accordance with the universal data schema and includes a set of item data 502 and a set of metadata 504 including property declarations. The item data 502 may be any set of data appropriate for inclusion within the data store. For example the item data 502 may be associated with a word processing document. The property declarations metadata 504 includes at least a basic type declaration for the item 500. For example, a default type association may be a Document type and the metadata 504 may set forth that the item 500 is a Document type item. Because the shell includes a default display view for each default type association, the shell may display the item 500 according the default display view for the Document type. The default display view for Documents types may, for example, include an icon used only with Document type items. By presenting the word processing item with this icon, a user can quickly recognize that the item 500 is a document. Those skilled in the art will recognize that any variety of default type associations and default display attributes are acceptable for the present invention.

B. Item Decoration View

Beyond property declarations, metadata associated with an item may include data indicating how the shell should decorate an item's presentation. Decorations, in this case can be though of as "hints" as to how to represent the item to a user. This metadata may be stored in accordance with an item decoration schema. The item decoration schema defines the item decoration view that the shell may utilize to present the item. For example, the item decoration data may describe the most important declared properties for an item. These "high value" properties may be the most desirable for presentation in the shell.

Item 500 may optionally include item decoration data 506 stored in accordance with an item decoration schema. To present the item 500, the item decoration data 506 may indicate a set of view fields appropriate for the presentation of the item 500. View fields are projections of declared properties, and common view fields may include "title," "author," "date of creation" or "last edited." The shell includes a set of standard view fields and independent software venders (ISVs) may define view fields which are appropriate for presentation of their data. When developing new item types, ISVs can either map item properties they define to the shell's view fields or they can provide their own view fields.

For example, the item data 502 may contain song data. The set of declared properties 506 may include properties such as song title, artist, date recorded, album, song length, and other declarations appropriate for such a song item. The item decoration data 506 may indicate that view fields "Title," "Artist" and "Album" should be displayed to the user when presenting the item 500 in the shell.

The item decoration data 506 may describe more truly decorative items regarding the item data 502 such as text presented with a declared property. For instance, one of the property declarations 504 may indicate a bitrate value to describe the quality of the recording. This property may be stored an integer BITRATE. The item decoration data 506 may request that the bitrate be displayed and also may decorate this field as "[BITRATE] kilobytes per second." In this method the bitrate field is appropriately decorated so that a user can easily understand the meaning of the bitrate value in a view field.

Those skilled in the art will recognize that the item decoration data 506 and its corresponding item decoration view may dictate a wide variety of presentation attributes. Item decorations can be any aspect of the display supported by the shell. Some common other item decorations are, for example, data formatting, default sort order, and default icon size. Additionally, the item decoration data 506 may describe common controls to use in displaying a given item. For example, a Ratings field might use a ratings control that represent the rating as a series of stars. The item decoration data 506 may describe tasks or verbs appropriate for use with an item. Those skilled in the art will recognize that the terms "task" and "verb" describe some action to be undertaken with regard to an item and such terms may be used interchangeably. For example, "Edit" or "Preview" may be appropriate tasks/verbs associated with an item. The shell may be furthered configured to launch applications in support of these tasks upon a user selection to perform the action with respect to the item.

Those skilled in the art will recognize that item decorations will change and grow over time. The invention contemplates that, when the new item decorations are implemented, new items can utilized these decorations, while older items will continue to display properly by utilizing the older display attributes provided by the shell.

Figure 6:
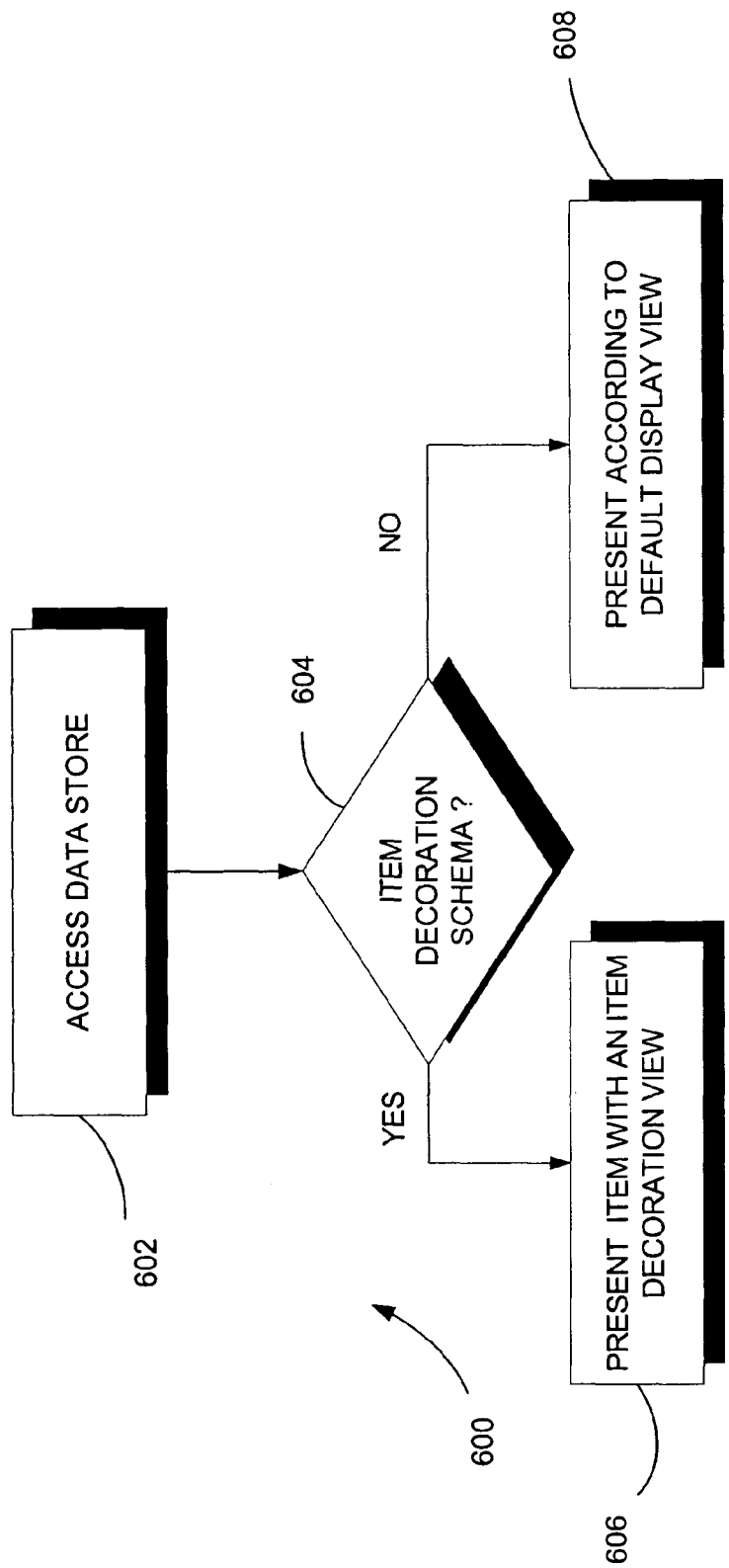
FIG. 6 is a flow diagram showing a method for presenting one or more items to a user in accordance with one embodiment of the present invention.

FIG. 6 displays a flow diagram illustrating a method 600 for presenting items to the user according to the present invention. At 602, the method 600 accesses a universal data store in response to a request to present one or more items to the user. At 604, the method considers one or more items selected for presentation. Items containing metadata stored in accordance with an item decoration schema are presented to the user according to an item decoration view as indicated at 606. Items which do not contain such metadata are presented according to a default display view as indicated at 608. Those skilled in the art will recognize that, as discussed above, these schemas and presentation views may include various display attributes which may be used in the presentation of each item in the data store.

C. Shell View

As described above, an item decoration view is sufficient to fully present a given item or a homogeneous set of items, comprised of items having like item decoration views. To display items with different item decoration schemas, the shell provides shell view schemas that present items according to shell decoration views. A shell view schema allows the shell or ISVs to declare appropriate views for given sets of heterogeneous data.

Items chosen for representation within a shell decoration view may include a common characteristic. Those skilled in the art will recognize that a wide variety of common characteristics may be acceptable for a shell decoration view. For example, a shell view schema could define a "Picture" view used to display common and appropriate fields and metadata for all known picture types (e.g., .GIF, .JPEG, .BMP, .TIFF, etc). The shell view schema overrides conflicting display attributes for a given item decoration view and presents each picture item according to the shell view schema. As another example, the shell could provide a "Document" shell view that is optimized around appropriate columns and metadata for the items produced by typical productivity applications, such a word processing documents, spreadsheets, or databases, even though the item decorations for each of these items may vary greatly from each other. Such a view has value by providing common properties among each of these documents. Those skilled in the art will recognize that, when later document types are installed, the shell view will be able to present these new items according to the consistent shell view even though the new type may not have been considered when the view was first created.

In addition to shaping the view fields appropriate for a given set of heterogeneous items, shell view schema may define further display attributes. For example, the view state, including icons properties, the size of the preview pane, and default sort order may be defined by the shell view schema. The view schema also contains property decorations, such as data formatting, to apply to various columns.

In cases where the shell view schema and the item decoration schema conflict, the shell view schema acts as an override. In cases where a display element is missing from a shell view schema, the shell view will fall back to the item decoration view for an appropriate display. In this way, the shell view can craft an appropriate view when displaying data not originally anticipated. Additionally, in one embodiment of the present invention, the shell view can defer to the item decoration view to provide a non-conflicting decorative element. For example, the shell view may make use of the "high value" metadata from the set of items it contains to construct an appropriate set of columns and metadata to display the items.

Those skilled in the art will recognize that the shell view schemas may provide a wide variety of display attributes and that ISVs may want to provide such shell views. The display attributes may include, without limitation: the size of the preview pane, metadata to display within the preview pane, custom controls to be used, and tasks and verbs appropriate for the presented items.

Figure 7:
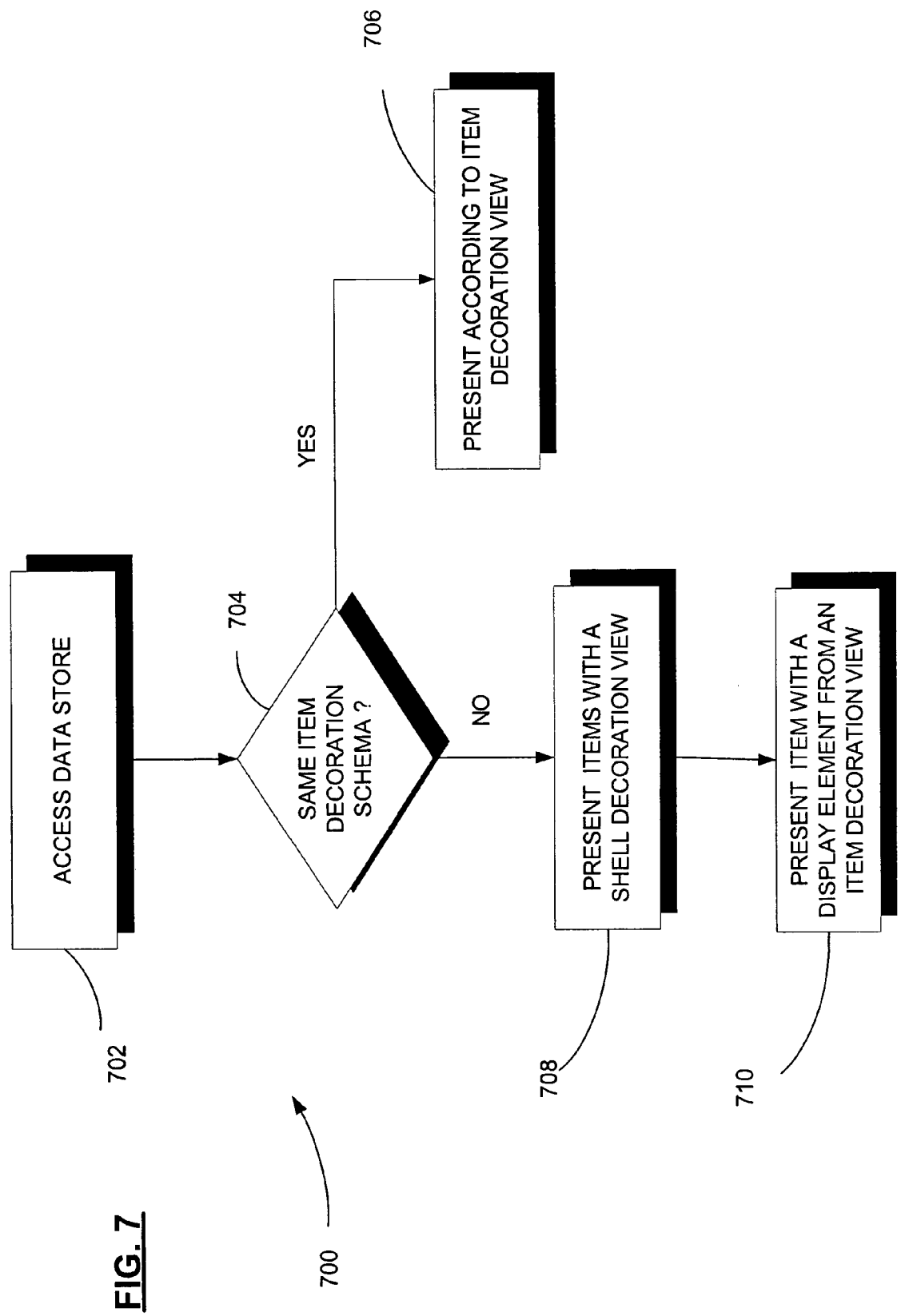
FIG. 7 is a flow diagram showing a method for presenting one or more items to a user in accordance with one embodiment of the present invention.

FIG. 7 displays a flow diagram illustrating a method 700 for presenting items to the user according to the present invention. At 702, the method 700 accesses the data store in response to a request to present one or more items to a user. At 704, a determination is made whether each item selected for presentation includes the same item decoration schema. If all items have such a common schema, the items are presented according to that schema as indicated at 706. If the presented items include items having different or no item display schemas, at 708 the set of items is presented according to a shell decoration view. As discussed above, such a shell view may be appropriate for presentation of a heterogeneous set of items. An optional step of presenting one or more of the selected items with display elements from an item decoration view is included at 710. While these display elements may not conflict with the shell decoration view, the elements may enhance the presentation of items by the shell.

Figure 8:
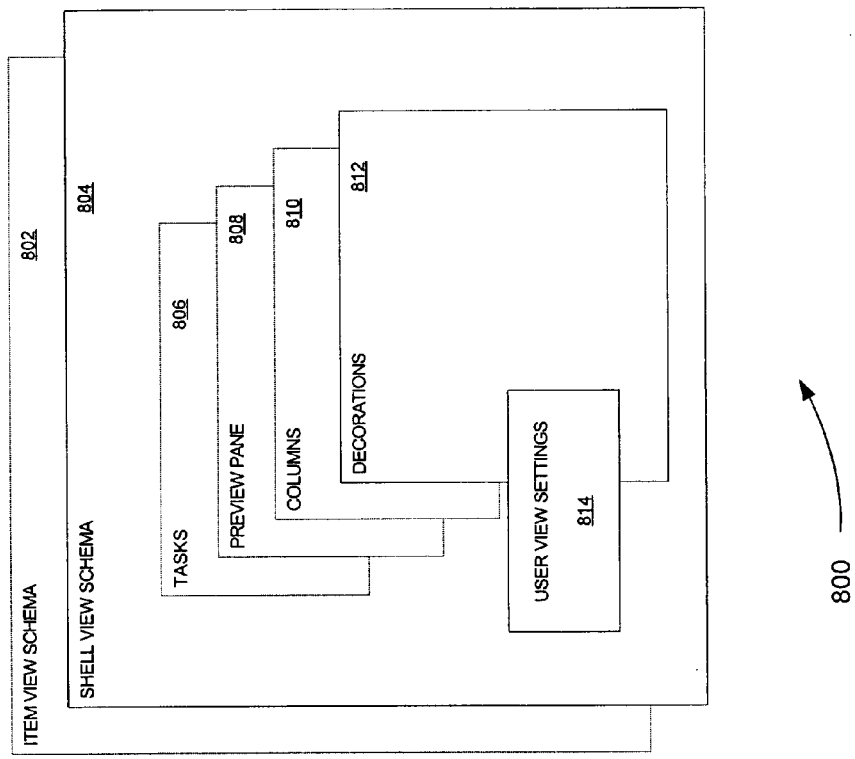
FIG. 8 is a diagram showing a view schema hierarchy in accordance with one embodiment of the present invention.

Turning to FIG. 8, a diagram of an exemplary view schema hierarchy 800 is presented. The bottom layer of the hierarchy is the item view schema 802. The item view schema 802 provides the basic display needed to represent an item or, if no view schema is supplied, provides a default display. Schemas that are above the item view schema 802 can defer or fall back upon its display elements when required.

Shell view schema 804 resides above the item view schema 802. As discussed above, a shell view schema may be utilized to display a set of items with diverse item views. The shell view schema defines tasks 806, preview pane characteristics 808, columns 810 and decorations 812 which are used to display items according to the shell view 804. The shell view may fall back upon the item view schema 802 to provide non-conflicting item decorations for use with the shell view 804. Additionally, user view settings 814 may reside within the shell view. These setting represent a user's desired presentation format for the shell items. Those skilled in the art will recognize that any number is display attributes may be defined within a display schema and that a user may be presented with numerous options and controls in relation to display settings.

D. Explorer Display View

The shell may also be configured to present items according to an explorer display view. An "explorer" may be referred to as a storage application and may be provide by the shell or by an ISVs. In one embodiment of the current invention, an explorer may be created to provide a holistic experience that aids users managing a large set of items. For example, the explorer may enable a user to view, query, navigate, launch into tasks, or organize selected items in a data store. The term "explorer" should not imply a location where the displayed items reside, and terms such as "activity center," "viewer" and "library" may be used interchangeably with "explorer" to describe a storage application according to the present invention.

Figure 9:
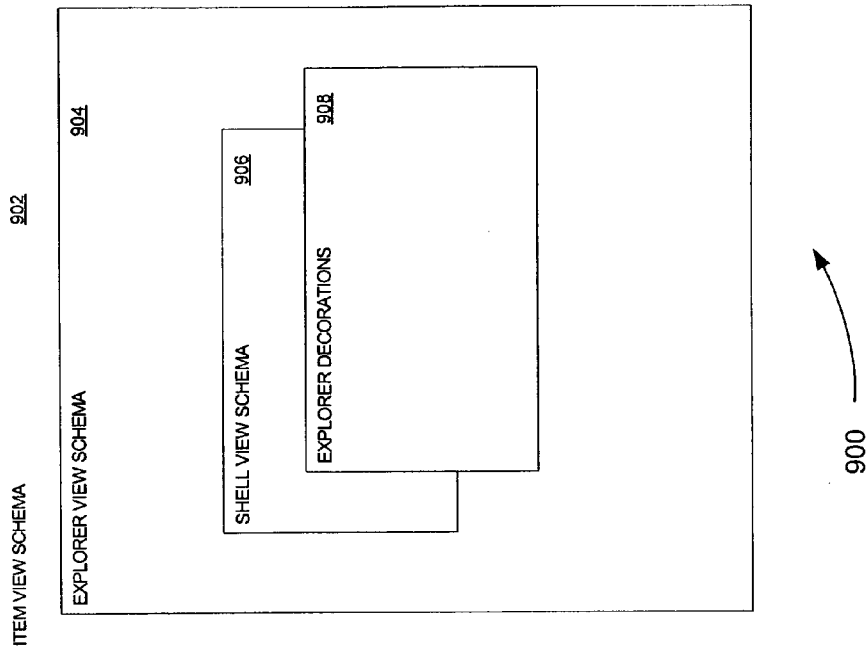
FIG. 9 is a diagram showing a view schema hierarchy including an explorer view schema in accordance with one embodiment of the present invention.

FIG. 9 shows an exemplary explorer schema hierarchy 900. The bottom layer of the hierarchy is the item view schema 902. The item view schema 902 provides the basic display needed to represent an item, and the explorer view schema 904 can defer or fall back upon its display elements when required.

The explorer view schema includes a shell view schema 906 and explorer decorations 908. The explorer decorations 908 decorate the explorer as a whole and provide display elements such as distinctive colors and branding elements. These explorer decorations 908 persist among the various views the explorer provides. Those skilled in the art will recognize that a wide variety of display attributes may be appropriate for the explorer decorations 908. For example, data queries or tasks/verbs associated with the explorer items may be appropriate for display with an explorer. Displayed tasks will preferably be coupled with an application capable of performing the task.

The explorer view schema may optionally include a shell view schema 906 or multiple shell view schemas. The shell view schema 906 may be configured to provide a shell view for a subset of explorer items. For example, an explorer may be configured to display song items to a user. A first shell view schema may be included to provide a display of albums and a second shell view schema may be included to provide a display of song tracks. In this manner, both types of items will have appropriate views within the explorer. As discussed above, the utilization of shell view relates to the presentation of a set of items which, optionally, may share a common characteristic.

The explorer may also rely on shell views included within the shell. If items selected for presentation within an explorer are not supported by any of the shell views included by the explorer, the shell may provide an appropriate shell view for use within the explorer. Similarly and as discussed above, the explorer may also fall back to an item display view or a default display view provided by the shell. This functionality insures that any item which can be displayed by the shell is also capable of display within the explorer. The explorer can be configured to defer to these shell provided display schemas or may rely upon them to, for example, provide a display for unanticipated data.

Figure 10:
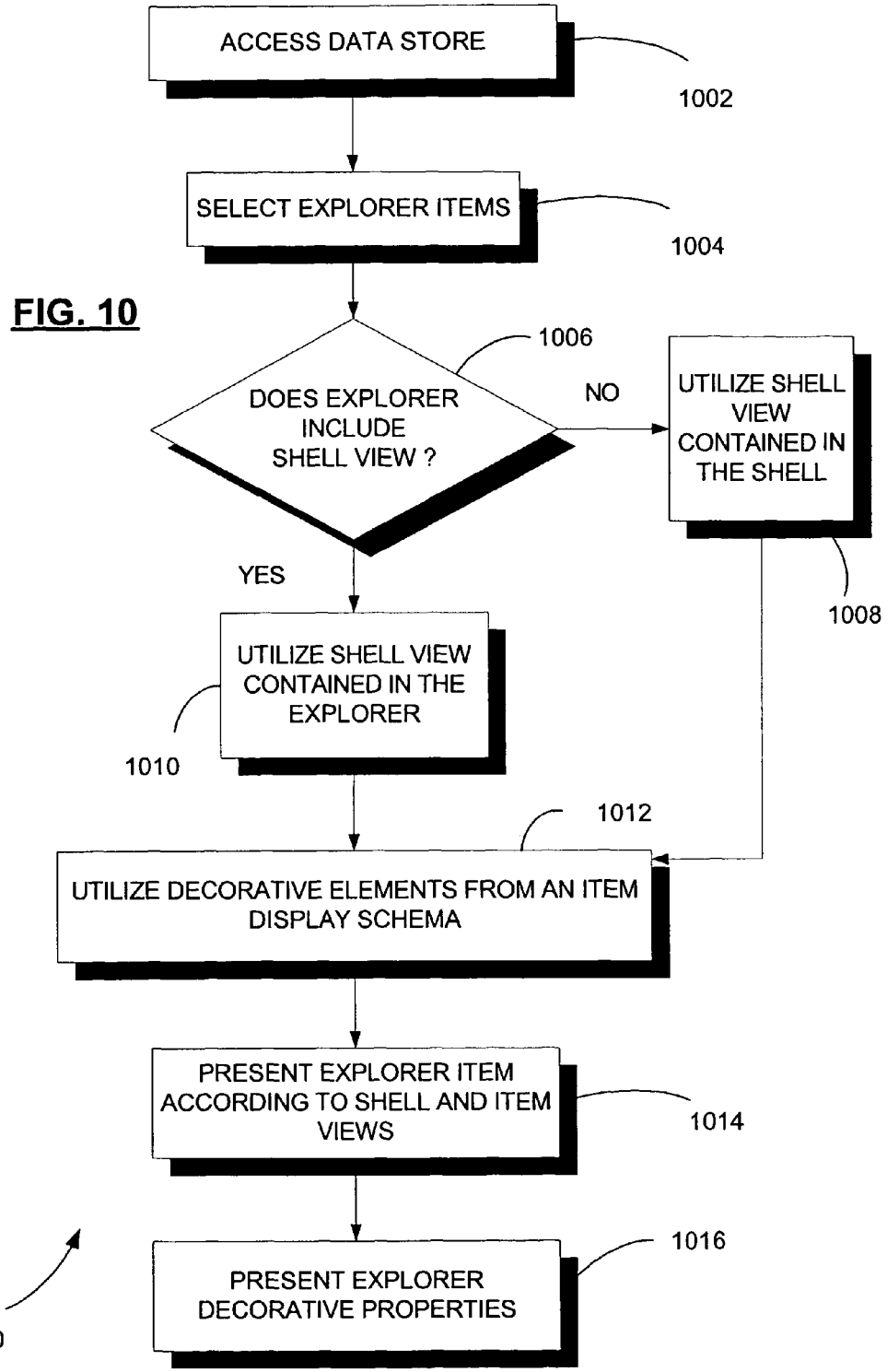
FIG. 10 is a flow diagram showing a method for presenting items to a user in accordance with one embodiment of the present invention.

FIG. 10 presents a method 1000 for presenting items in an explorer display according to the present invention. At 1002, the method 1000 accesses the data store and, at 1004, selects items to be displayed in the explorer. The selection of explorer items may rely on consideration of item declarations also referred to as field entries. As discussed above, items in a data store may contain property information. This information is declared when an item is placed in the data store and may be updated throughout the life of the item. Such declarations may be considered field entries corresponding to a set of property fields. For example entries in a property field "author" may contain the authorship information for a given item.

It may be desirable to present items sharing one or more field entries. For example, an explorer including each item authored by a particular person may be desired. By considering the field entries of the author field, the explorer is able select such explorer items authored by that particular person from the data store. Those skilled in the art will recognize that the mechanics of such a database query are well known.

At 1006, a determination is made whether the explorer includes a shell view which is appropriate for the presentation of an explorer item. If no such appropriate shell view is found in the explorer, the method 1008 utilizes a view contained in the shell as indicated at 1008. If a proper shell view is included in the explorer, the method 1000, at 1010, utilizes that shell view to present the item. At 1012, an optional step of utilizing decorative elements from an item display schema is performed. As described above, the explorer may use non-conflicting decorations from an item view schema to enhance the presentation of an item. At 1014, the explorer item is presented to the user according to the shell and items views. The explorer decorative properties are presented at 1016. These properties may be a wide variety of display attributes and may include data queries or task associated with the explorer items.

E. Explorer Development

Explorers may be created for a wide variety of item types. In one embodiment of the present invention, explorers can be defined with little or no programming. By allowing explorers to be created in a data-driven way, ease of development is enhanced while providing a consistent look and feel across explorers.

In certain embodiments, explorers may allow restrictions on what types (including item extensions and file extensions) of items they can present or explorers can choose to allow items of all types. Also explorers can choose to allow items types with a specific set of item extensions. For example, a Legal Item Explorer may display all items with a "LegalItemExtension" attached. Explorers can choose to allow items of a certain type and any file extension that maps to that type. For example, a Music Item Explorer can show all music file extensions such as mp3 or wma. Furthermore, explorers can choose to allow items of a certain set of file extensions only. If an explorer is restricted to a certain set of types, then items of other types cannot be saved or dropped into this explorer. Explorers can redefine type associations for the types that they allow, and explorers may choose to selectively disallow overrides or may choose to disallow addition of new commands. Furthermore explorers can decide whether they will let end-users override type associations within the explorer.

Considering the foregoing, those skilled in the art will recognize that by providing data-driven development techniques for creating an explorer for use within an item-type environment, explorers may be defined a declarative manner and without the use of custom code.

FIG. 11 displays a method 1100 for presenting items according to an explorer display schema. At 1102, the method 1100 selects a desired field entry. As discussed above, this desired field entry may correspond to a declared property associated with an item. For example, a "photo album" explorer may have a desired field entry requiring inclusion of items containing picture data.

At 1104, an explorer display schema is defined. This display schema may include a shell view schema and explorer decorations. The explorer decorations decorate the explorer as a whole and provide display elements such as distinctive colors and branding elements. These explorer decorations persist among the various views the explorer provides. A wide variety of display attributes may be appropriate for the explorer decorations. For example, data queries or tasks/verbs associated with the explorer items may be appropriate for display with an explorer. Displayed tasks will preferably be coupled with an application capable of performing the task. The explorer view schema may include a shell view schema or multiple shell view schemas. The shell view schema may be configured to provide a shell view for a subset of explorer items.

At 1106, the method 1100 accesses the data store to select the explorer items. The explorer items are associated with the desired field entry. Those skilled in the art will recognize that the selection of such items in a database are well known in the art. Those skilled in the art will further recognize that developers may create explorers configured for such interaction. Development of explorers capable of accessing a data store is contemplated by the instant invention.

At 1108, the explorer items are displayed according to an explorer display schema. The explorer display schema is described above, and this display may also include interaction with a shell browser. For example the shell may provide one or more shell views. In addition, item decoration elements from an item decoration schema may be utilized to enhance the presentation of the explorer items.

As those skilled in the art will recognize, the explorer storage application may be considered an application and/or an extension of the shell browser. Consequently, the foregoing description is appropriate for both depictions of the present invention. As an application, the explorer program may include a shell interaction module that is configured to interact with the shell browser. Such interaction allows the program to communicate information with the shell and allows the software to work together to present items. The shell interaction module may facilitate the accessing of the data store and may provide display attributes. Such interaction between an application and the shell is well known in the art.

E. Presentation of Related Items

The present invention may also display related items in the data store to the user. As described above, the items in a data store may include items having one or more declared properties. An item may have declared relationships which elucidate the other items in the data store which share a relationship. For instance, an item containing an email address may declare a relationship to an item containing other contact information for the owner of the email address. The shell may utilize this declared relationship to present the other contact information upon a user request. The shell may also determine relationships by considering an item's declared properties. For example, a set of documents may be related if they share a common property; items with an extension "LegalItemExtension" may be related if a common value is stored as part of the extension. Such a relationship may be determined by a data query well known in the art.

FIG. 12 displays a method 1200 for presenting related items according to the present invention. At 1202, the method 1200 accesses the data store and, at 1204, relationships between items in the data store are determined. As described above, such a determination utilizes the declared properties included with an item. This determination may be in response to a user input. For example, an item having a set of declared item characteristics may be displayed to a user. The item characteristic and relational information may be displayed with the item. The user may select one of the characteristics and input a request to see other items sharing the item characteristic. At 1206, the method 1200 presents related items to the user. Such presentation may include any display schema known in the art.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A computer-implemented method for presenting related items in a universal data storage device to a user, the method comprising:
    accepting a user input representing a selection to view items in the universal data storage device which are related to a selected item;
    accessing data in said universal data storage device, wherein said universal data storage device stores a plurality of items in accordance with a universal data schema, and wherein at least a portion of said plurality of items contain relational information which allows relationships between said plurality of items to be determined, wherein said relational information corresponding to the selected item includes a set of item characteristics associated with the selected item and wherein said user input represents a selection to view one or more items in the universal data storage device which share one of said set of item characteristics with the selected item;
    utilizing said relational information to determine a relationship between a selected item and one or more of the items containing said relational information in the data storage device, wherein said relationship has a relationship type; and
    displaying said selected item and one or more related items to the user, wherein said displaying includes presenting the displayed items with a shell view schema, wherein said displaying further includes presenting one or more item decorations defined by at least a portion of the displayed items, wherein conflicts between said shell view schema and said one or more item decorations are resolved in favor of said shell view schema such that the selected item and one or more related items are displayed using only said shell view schema and without said one or more item decorations defined by the displayed items.

2. The method of claim 1, wherein the displaying of said selected item and one or more related items includes displaying at least a portion of said relational information to a user.

3. The method of claim 1, wherein said method further comprises receiving a user input representing a selection to view one or more items in the data storage device which are related to said selected item.

4. The method of claim 3, wherein the displaying of said selected item and one or more related items is responsive to said input.

5. The method of claim 1 wherein, when a display element is missing from the shell view schema, displaying a corresponding item decoration for the missing display element.

6. The method of claim 1 further comprising displaying a non-conflicting item decoration in the shell view in addition to the display elements defined by the shell view schema.

7. A shell for presenting related items in a universal data storage device to a user, the shell comprising:
- a data storage device interaction component which retrieves data associated with one or more items from the universal data storage device, wherein said one or more items are stored in accordance with a universal data schema and at least a portion of said one or more items contain relational information that allows relationships between two or more items to be determined;
- a related item presentation component which utilizes said retrieved data to present related items to a user, wherein the relationship presentation component is configured to present a selected item to a user and is further configured to utilize said relational information to present one or more items in said data storage device which are related to said selected item; and
- a shell view component that stores a plurality of shell view schemas that are associated with one or more relationship types, wherein each of at least a portion of said plurality of shell view schemas identifies one or more visual elements selected as appropriate for display with items of one of said one or more relationship types,
- wherein said related item presentation component presents said related items with one or more item decorations defined by at least a portion of the related items and with one of said plurality of shell view schemas, wherein conflicts between a shell view schema and said one or more item decorations are resolved in favor of said shell view schema such that the related items are displayed using only said shell view schema and without said one or more item decorations defined by the displayed items;
- wherein the shell is configured to accent a user input representing a selection to view items in the data storage device which are related to said selected item, and wherein said relational information corresponding to the selected item includes a set of item characteristics associated with the selected item and wherein said user input represents a selection to view one or more items in the data storage device which share one of said set of item characteristics with the selected item.

8. The shell of claim 7, wherein the relational information corresponding to one or more of said plurality of items includes a set of item characteristics.

9. The shell of claim 8, wherein said related item presentation component is configured to present one or more of said set of item characteristics to a user.

10. The shell of claim 8, wherein said related item presentation component is configured to present one or more items in the data storage device which share one of said item characteristics.

11. The shell of claim 8, wherein the related item presentation component is configured to present at least a portion of said relational information.

* * * * *

UNITED STATES PATENT AND TRADEMARK OFFICE
CERTIFICATE OF CORRECTION

| | | |
|---|---|---|
| PATENT NO. | : 7,730,073 B2 | Page 1 of 1 |
| APPLICATION NO. | : 10/691888 | |
| DATED | : June 1, 2010 | |
| INVENTOR(S) | : Timothy P. McKee et al. | |

It is certified that error appears in the above-identified patent and that said Letters Patent is hereby corrected as shown below:

In column 1, line 34, after "10/646,646," insert -- filed --.

In column 22, line 6, in Claim 7, delete "accent" and insert -- accept --, therefor.

In column 22, line 25, in Claim 11, delete "claim 8," and insert -- claim 7, --, therefor.

Signed and Sealed this
Eighth Day of February, 2011

David J. Kappos
*Director of the United States Patent and Trademark Office*